United States Patent
Tani et al.

(10) Patent No.: US 6,555,004 B2
(45) Date of Patent: Apr. 29, 2003

(54) METHOD FOR SEPARATING CATALYST, PRODUCT AND SOLVENT

(75) Inventors: Nobuhiro Tani, Niihama (JP); Shuzo Murata, Niihama (JP)

(73) Assignees: Sumitomo Chemical Company, Limited, Osaka (JP); Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/845,165

(22) Filed: May 1, 2001

(65) Prior Publication Data

US 2001/0037977 A1 Nov. 8, 2001

(30) Foreign Application Priority Data

May 2, 2000 (JP) .................................. 2000/133331

(51) Int. Cl.[7] .................................... B01D 11/00
(52) U.S. Cl. ................. 210/634; 210/774; 502/22; 502/24; 562/549; 568/818
(58) Field of Search .................. 210/634, 638, 210/639, 774, 805, 806; 568/818, 835, 836; 562/549; 203/29, 38, 43, 47; 502/22, 24; 548/545

(56) References Cited

U.S. PATENT DOCUMENTS

| | | | |
|---|---|---|---|
| 3,870,760 A | * | 3/1975 | Tanaka et al. |
| 4,532,347 A | * | 7/1985 | Vaughan .................... 210/638 |
| 5,093,509 A | | 3/1992 | Meyer et al. ................. 502/24 |
| 5,981,420 A | * | 11/1999 | Nakano et al. ............. 568/836 |
| 6,037,477 A | * | 3/2000 | Ishii et al. .................. 548/545 |
| 6,096,673 A | | 8/2000 | Fischer ........................ 502/22 |
| 6,133,488 A | * | 10/2000 | Hirai ........................... 568/818 |

FOREIGN PATENT DOCUMENTS

| | | |
|---|---|---|
| DE | 195 39 331 | 4/1997 |
| EP | 0 825 165 A2 | 2/1998 |
| EP | 0 878 458 | 11/1998 |
| JP | 11-188265 | 7/1999 |

* cited by examiner

Primary Examiner—Joseph Drodge
(74) Attorney, Agent, or Firm—Sughrue Mion, PLLC

(57) ABSTRACT

A method for separating an oxidation catalyst, an oxidation reaction product and a reaction solvent from a reaction mixture obtained by oxidizing a substrate in the presence of an oxidation catalyst containing an aromatic N-hydroxyimide compound and a transition metal, the method including (i) distilling the reaction solvent from the reaction mixture in the presence of an organic solvent which is immiscible with the reaction solvent to obtain the reaction mixture containing the reaction solvent in an amount of 5 parts by weight or less per one part by weight of the N-hydroxyimide compound, and the oxidation catalyst precipitated, and (ii) separating the reaction mixture obtained in the step (i) by a solid-liquid separation method into the oxidation product and the oxidation catalyst.

8 Claims, No Drawings

METHOD FOR SEPARATING CATALYST, PRODUCT AND SOLVENT

BACKGROUND OF THE INVENTION

1. Field of the Invention

The present invention relates to a method for separating a catalyst, a reaction product and a solvent from a reaction mixture. In particular, the present invention relates to a method for separating an oxidation catalyst comprising an aromatic N-hydroxyimide compound and a transition metal, a product of an oxidation reaction, and a solvent used as a reaction medium.

2. Background Art

As methods for separating an oxidation catalyst and a product of an oxidation reaction, for example, the following methods are known:

a method comprising separating the oxidation catalyst and the oxidation product using a water-soluble solvent and water-insoluble solvent to part the oxidation catalyst in the water-insoluble solvent and the oxidation product in the water-soluble solvent (JP-A-10-114702);

a method comprising filtrating the mixture of the oxidation product and the oxidation catalyst, followed by concentrating, distilling, extracting and crystallizing (JP-A-11-188265).

However, these methods have a problem that, when the oxidation catalyst and the oxidation product are both insoluble in water, it is difficult to separate them from each other by these methods, since the both compounds are contained in the water insoluble solvent.

SUMMARY OF THE INVENTION

One object of the present invention is to provide a method for effectively separating an oxidation catalyst and an oxidation product from each other even when the both compounds are insoluble in water.

According to the present invention, the above object is accomplished by a method for separating an oxidation catalyst, a product of an oxidation reaction and a reaction solvent from a reaction mixture obtained by oxidizing a substrate in the presence of an oxidation catalyst which comprises an aromatic N-hydroxyimide compound and a transition metal, the method comprising the steps of:

(i) distilling said reaction solvent from said reaction mixture in the presence of an organic solvent which is immiscible with said reaction solvent to obtain the reaction mixture which contains said reaction solvent in an amount of about 5 parts by weight or less per one part by weight of the N-hydroxyimide compound, and the oxidation catalyst precipitated, and (ii) separating the reaction mixture obtained in the step (i) by a solid-liquid separation method to obtain the oxidation product and the oxidation catalyst.

DETAILED DESCRIPTION OF THE INVENTION

In a method of the present invention, firstly a reaction solvent is distilled from a reaction mixture, which is obtained by oxidizing a substrate using an oxidation catalyst comprising an aromatic N-hydroxyimide compound and a transition metal, in the presence of an organic solvent which is immiscible with the reaction solvent to precipitate the oxidation catalyst. Then, the reaction mixture obtained is subjected to the solid-liquid separation method to obtain the oxidation product in the solution (liquid) phase and the oxidation catalyst in the solid phase.

The distillation of the reaction solvent from the reaction mixture is carried out until the amount of the reaction solvent in the reaction mixture is decreased to 5 parts by weight or less per one part by weight of the N-hydroxyimide compound.

The above method can sufficiently separate the oxidation catalyst, the oxidation product and the reaction solvent, respectively.

Examples of the aromatic N-hydroxyimide, which is contained in the catalyst, include N-hydroxyphthalimide, N-hydroxynaphthylimide, etc. Also, aromatic N-hydroxyimides, in which at least one hydrogen atom on the aromatic ring is substituted with a substituent (e.g. an alkyl group, a cycloalkyl group, an aryl group, a halogen atom, etc.), may be used.

The amount of the aromatic N-hydroxyimine used in the oxidation reaction may be from 0.01 to 20% by mole, preferably from 0.1 to 10% by mole, based on the amount of the substrate.

The transition metal contained in the oxidation catalyst used in the present invention is preferably Co, Ce or Mn, or a mixture of Co, Ce or Mn and at least one metal element selected from the group consisting of Cr, Mo, Mn, Fe, Ru, Rh, Ni, Cu and Ce.

These elements may be used in the form of metal oxides, organic acid salts, inorganic acid salts, halides, or complexes such as acetylacetonates, or polyphosphates, and so on.

The amount of the transition metal used in the oxidation reaction may be from 0.0001 to 1% by mole, preferably from 0.001 to 0.5% by mole, based on the amount of the substrate.

Examples of the substrate which is oxidized with the oxidation reaction include hydrocarbons, alcohols, etc. Any hydrocarbon may be used insofar as it has an oxidizable site.

Specific examples of such hydrocarbons include saturated or unsaturated aliphatic chain hydrocarbons which may optionally have a substituent, saturated or unsaturated alicyclic hydrocarbons which may optionally have a substituent, etc. Examples of the saturated or unsaturated aliphatic chain hydrocarbons include satureted hydrocarbons having 4 to 20 carbon atoms (e.g. butane, isobutane, pentane, hexane, octane, decane, etc.), olefinic hydrocarbons having 4 to 20 carbon atoms (e.g. 2-butene, isobutene, etc.), linear or branched unsaturated hydrocarbons (e.g. 1,3-butadiene, 2-methyl-1,3-butadiene, etc.), and so on. Examples of the saturated or unsaturated alicyclic hydrocarbons include cycloalkanes (e.g. cyclobutane, cyclopentane, cyclohexane, cycloheptane, cyclooctane, cyclononane, cyclodecane, etc.), cycloalkenes (e.g. cyclopropene, cyclobutene, cyclopentene, cyclohexene, cycloheptene, cyclooctene, cyclononene, cyclodecene, etc.), and so on.

Specific examples of the alcohols may be the alcohol derivatives of the above hydrocarbons and include aliphatic chain monohydric alcohols, aliphatic chain polyhydric alcohols, alicyclic monohydric alcohols, alicyclic polyhydric alcohols, etc.

The hydrocarbons or the alcohols are oxidized to form corresponding alcohols, aldehydes, ketones or organic carboxylic acids as the oxidation products.

The method of the present invention can fully separate the oxidation catalyst and the oxidation product from each other, even when they are both water-insoluble compounds, which cannot be sufficiently separated by the conventional separation methods.

Examples of the reaction solvent used in the oxidation process in the present invention include aprotic solvents (e.g. benzonitrile, acetonitrile, etc.), organic acids (e.g. formic acid, acetic acid, etc.), and inorganic acids (e.g. hydrochloric acid, sulfuric acid, etc.). These solvents may be used independently or as a mixture of two or more of them.

The amount of the reaction solvent used in the oxidation reaction may be at least 0.01 part by weight, preferably at least 0.1 part by weight, based on one part by weight of the substrate.

In the separation method of the present invention, the reaction solvent is distilled from the reaction mixture, which has been obtained in the oxidation reaction of the substrate, in the presence of the organic solvent immiscible with the reaction solvent. The organic solvent immiscible with the reaction mixture is not limited in particular, insofar as the former has no or little miscibility with the reaction solvent. That is, any organic solvent may be used as long as it separates from the reaction solvent when it is mixed with the reaction solvent and allowed to stand still. Preferably, the organic solvent is a poor solvent with the oxidation catalyst from the viewpoint of the easiness of the recovery of the catalyst.

Examples of such a organic solvent include hydrocarbons, halogenated hydrocarbons, ethers, water-insoluble ketones, water-insoluble esters, etc. Specific examples of the organic solvent include pentane, hexane, heptane, cyclopentane, cyclohexane, cycloheptane, dichloroethane, tert.-butyl methyl ether, ethyl acetate, isopropyl acetate, etc. Preferably, the organic solvent has one to 10 carbon atoms since it is easy to be distilled.

The substrate may be used as the organic solvent immiscible with the reaction mixture when the substrate remains in the reaction mixture after the oxidation reaction, and functions as an organic solvent immiscible with the reaction solvent.

The distillation of the reaction solvent from the reaction mixture may be carried out in the presence of the organic solvent immiscible with the reaction solvent, usually while stirring under an atmospheric pressure or a reduced pressure. The distillation of the reaction solvent can lead to the precipitation of the oxidation catalyst in the reaction mixture. Examples of methods for distilling the reaction solvent in the presence of the organic solvent immiscible with the reaction solvent include the following methods:

a method comprising adding the organic solvent immiscible with the reaction solvent to the reaction mixture, and then distilling the reaction solvent;

a method comprising distilling the reaction solvent while adding, to the reaction mixture, the organic solvent immiscible with the reaction solvent; and a method comprising distilling the reaction solvent while adding the reaction mixture to the organic solvent immiscible with the reaction solvent.

A temperature in the course of the distillation of the reaction solvent may be at least a temperature at which the reaction solvent can be removed by evaporation and is, for example, at least the boiling point of the reaction solvent, or at least an azeotropic point when the reaction solvent and the organic solvent immiscible with the reaction solvent form an azeotrope. Since the distillation of the reaction solvent may be performed under elevated or decreased pressure, the distillation temperature may be suitably adjusted accordingly.

The amount of the organic solvent immiscible with the reaction mixture, which is present in the reaction mixture in the course of the distillation of the reaction solvent, may be from 0.1 to 100 parts by weight, preferably from 0.5 to 20 parts by weight, per one part by weight of the reaction solvent.

The distillation of the reaction solvent may be carried out until the amount of the reaction solvent is decreased to about 5 parts by weight or less, preferably about one part by weight or less, per one part by weight of the aromatic N-hydroxyimide compound.

After the distillation of the reaction solvent, the reaction mixture obtained is subjected to the solid-liquid separation with any separation method such as filtration, decantation, centrifugation, etc., and thus the precipitated oxidation catalyst and oxidation product are separated from each other and recovered, respectively.

The method of the present invention can easily separate the oxidation catalyst, the oxidation product and the reaction solvent respectively, even when the oxidation catalyst and the oxidation product are both insoluble in water.

EXAMPLES

The present invention will be illustrated by the following Examples, which will not limit the scope of the invention in any way.

Example 1

An oxidation reaction mixture (149 g), which comprised 58 wt. % of cyclohexane, 33 wt. % of acetonitrile, 4 wt. % of cyclohexanone, 1 wt. % of cyclohexanol, 1 wt. % of N-hydroxyphthalimide and 0.01 wt. % of cobalt and which was maintained at 50° C., was dropwise added to cyclohexane (92 g) maintained at 76° C. while stirring over 1.5 hours. As soon as the dropwise addition was started, the distillation of the azeotrope of cyclohexane and acetonitrile was started. The warming and distillation of the azeoptrope were continued for 50 minutes after the completion of the addition of the reaction mixture. Thereby, 98% of acetonitrile was removed from the reaction mixture. The residual reaction mixture and cyclohexane (15 g) were filtrated under pressure to separate the resulting mixture into a solution part and a filter cake.

The parting ratios of N-hydroxyphthalmide and cobalt, which were contained in the oxidation reaction mixture prior to the distillation of the solvent, in the filter cake were 95% and 100%, respectively, while the parting ratios thereof in the solution part were 5% and 0%, respectively. The parting ratios of cyclohexanone and cyclohexanol, which were contained in the oxidation reaction mixture prior to the distillation of the solvent, in the filter cake were 14% and 13%, respectively, while the parting ratios thereof in the solution part were 83% and 85%, respectively.

Example 2

An oxidation reaction mixture (37 g), which comprised 58 wt. % of cyclohexane, 32 wt. % of acetonitrile, 4 wt. % of cyclohexanone, 1 wt. % of cyclohexanol, 1 wt. % of N-hydroxyphthalimide and 0.01 wt. % of cobalt, and cyclohexane (23 g) were mixed and warmed at a temperature of 63 to 79° C. to distill off the azeotrope of cyclohexane and acetonitrile. Thus, 96% of acetonitrile was removed from the reaction mixture. The residual reaction mixture and cyclohexane (45 g) were filtrated under pressure to separate the resulting mixture into a solution part and a filter cake.

The parting ratios of N-hydroxyphthalmide and cobalt, which were contained in the oxidation reaction mixture prior to the distillation of the solvent, in the filter cake were 99% and 100%, respectively, while the parting ratios thereof in the solution part were 1% and 0%, respectively. The parting ratios of cyclohexanone and cyclohexanol, which were contained in the oxidation reaction mixture prior to the distillation of the solvent, in the filter cake were 3% and 4%, respectively, while the parting ratios thereof in the solution part were 92% and 91%, respectively.

Comparative Example 1

A model liquid of an oxidation reaction mixture containing 21 g of cyclohexane, 12 g of acetonitrile, 1.5 g of cyclohexanone, 0.4 g of cyclohexanol, 0.4 g of N-hydroxyphthalimide and 0.01 g of cobalt was warmed at 65° C. and then the mixture of cyclohexane and acetonitrile was distilled. As a result, 23% of acetonitrile remained in the model liquid. The residual model liquid and cyclohexane (40 g) were filtrated under pressure to separate the mixture into a solution part and a filter cake.

The parting ratios of N-hydroxyphthalmide and cobalt, which were contained in the oxidation reaction mixture prior to the distillation of the solvent, in the filter cake were 81% and 100%, respectively, while the parting ratios thereof in the solution part were 19% and 0%, respectively. The parting ratios of cyclohexanone and cyclohexanol, which were contained in the oxidation reaction mixture prior to the distillation of the solvent, in the filter cake were 1.5% and 0.9%, respectively, while the parting ratios thereof in the solution part were 94% and 95%, respectively.

What is claimed is:

1. A method for separating an oxidation catalyst, a product of an oxidation reaction and a reaction solvent from a reaction mixture obtained by oxidizing a substrate in the presence of an oxidation catalyst which comprises an aromatic N-hydroxyimide compound and a transition metal, the method comprising the steps of:

(i) distilling said reaction solvent from said reaction mixture in the presence of an organic solvent which is immiscible with said reaction solvent to obtain a residual reaction mixture which contains said reaction solvent in an amount of about 5 parts by weight or less per one part by weight of the N-hydroxyimide compound and precipitated oxidation catalyst, and (ii) separating said residual reaction mixture obtained in the step (i) by a solid liquid separation method to obtain the oxidation product and the oxidation catalyst.

2. The method according to claim 1, wherein in the step (i), said reaction solvent is distilled from the reaction mixture while adding the reaction mixture to the organic solvent immiscible with the reaction solvent.

3. The method according to claim 1, wherein the substrate is at least one compound selected from the group consisting of cycloalkanes and cycloalkanols.

4. The method according to any one of claim 1–3, wherein said reaction solvent is acetonitrile.

5. The method according to any one of claim 1–3, wherein said organic solvent immiscible with the reaction solvent is cyclohexane.

6. The method according to claim 1, wherein the oxidation catalyst and the oxidation product are insoluble in water.

7. The method according to claim 1, wherein said reaction solvent and said organic solvent immiscible with the reaction solvent form an azeotrope.

8. The method according to claim 1, wherein said organic solvent immiscible with the reaction solvent is a poor solvent with the oxidation catalyst.

* * * * *